United States Patent [19]

Chee et al.

[11] Patent Number: 4,767,656
[45] Date of Patent: Aug. 30, 1988

[54] COMPOSITE MATERIAL STRUCTURE WITH INTEGRAL FIRE PROTECTION

[75] Inventors: Wan T. Chee, Bellevue; Douglas McLaren, Seattle, both of Wash.; Keith E. Therrien, Wausau, Wis.

[73] Assignee: The Boeing Company, Seattle, Wash.

[21] Appl. No.: 573,976

[22] PCT Filed: Jan. 9, 1984

[86] PCT No.: PCT/US84/00023

§ 371 Date: Jan. 9, 1984

§ 102(e) Date: Jan. 9, 1984

[51] Int. Cl.[4] .............................................. B32B 3/12
[52] U.S. Cl. .................................. 428/116; 156/307.4; 244/129.2; 244/133; 244/158 A; 428/246; 428/408; 428/435; 428/473.5; 428/902; 428/920
[58] Field of Search ............... 428/116, 246, 251, 284, 428/285, 287, 408, 902, 920, 921, 473.5, 435; 156/307.4; 244/129.2, 135 R, 158 A, 133

[56] References Cited

U.S. PATENT DOCUMENTS

| | | | |
|---|---|---|---|
| 2,405,785 | 8/1946 | Goddard | 60/44 |
| 2,532,709 | 12/1950 | Goddard | 60/44 |
| 2,551,112 | 5/1951 | Goddard | 60/44 |
| 2,551,115 | 5/1951 | Goddard | 60/44 |
| 2,632,743 | 3/1953 | Eckert | 260/17.3 |
| 2,743,188 | 4/1956 | Hunter | 106/287 |
| 2,795,109 | 6/1957 | Hryniszak | 60/39.51 |
| 2,835,107 | 5/1958 | Ward | 60/35.6 |
| 2,986,878 | 6/1961 | Townsend | 60/39.11 |
| 2,992,960 | 7/1961 | Leeg et al. | 154/128 |
| 3,092,530 | 6/1963 | Plummer | 154/44 |
| 3,106,503 | 10/1963 | Randall et al. | 156/290 |
| 3,122,883 | 3/1964 | Terner | 60/35.6 |
| 3,137,602 | 6/1964 | Lincoln | 156/89 |
| 3,210,233 | 10/1965 | Kummer et al. | 161/68 |
| 3,296,060 | 1/1967 | Seitzinger | 161/115 |
| 3,352,105 | 11/1967 | Cox et al. | 60/39.11 |
| 3,567,162 | 3/1971 | Lea | 244/121 |
| 3,573,123 | 3/1971 | Siegel et al. | 156/171 |
| 3,600,249 | 8/1971 | Jackson et al. | 156/197 |
| 3,630,988 | 12/1971 | Deyrup | 260/37 N |
| 3,647,529 | 3/1972 | Lubowitz et al. | 117/161 |
| 3,666,617 | 5/1972 | Marcbriak | 161/186 |
| 3,671,487 | 6/1972 | Abolins | 260/40 |
| 3,689,300 | 9/1972 | Bunger et al. | 106/287 |
| 3,691,000 | 9/1972 | Kalnin | 161/60 |
| 3,703,385 | 11/1972 | Zwickert | 106/15 |
| 3,713,959 | 1/1973 | Rottmayer et al. | 161/59 |
| 3,779,006 | 12/1973 | Lewis et al. | 60/39.11 |
| 3,799,056 | 3/1974 | Colignon | 102/105 |
| 3,811,997 | 5/1974 | Yuan | 161/68 |
| 3,849,178 | 11/1974 | Feldman | 117/72 |
| 3,875,106 | 4/1975 | Lazzaro | 260/37 |
| 3,899,626 | 8/1975 | Steffen | 428/474 |
| 3,914,494 | 10/1975 | Park | 428/247 |
| 3,916,057 | 10/1975 | Hatch et al. | 428/236 |
| 3,930,085 | 12/1975 | Pasiuk | 428/116 |
| 3,930,916 | 1/1976 | Shelley | 156/71 |
| 3,933,689 | 1/1976 | Ray et al. | 260/2.5 |
| 3,967,033 | 6/1976 | Carpenter | 428/307 |
| 4,061,812 | 12/1977 | Gilwee, Jr. et al. | 428/117 |
| 4,095,985 | 6/1978 | Brown | 106/15 |

(List continued on next page.)

FOREIGN PATENT DOCUMENTS 0075033 3/1983 European Pat. Off. .

*Primary Examiner*—James J. Bell
*Attorney, Agent, or Firm*—Joan H. Pauly

[57] ABSTRACT

A load-bearing composite material structure (2, 2') has a plurality of layers of composite material. Each layer includes a matrix material (4) that maintains its structural integrity at 1200° F. for at least five minutes. Preferred matrix materials are polyimide resins. Outer layers that will be directly exposed to a fire are reinforced with a woven fabric (8) that is sufficiently flame resistant and has a sufficiently fine weave to prevent flame penetration at 2000° F. for at least fifteen minutes. The woven fabric (8) is preferably ceramic. The rest of the layers are reinforced with a fibrous material (6) to provide the necessary structural strength. The layers may be laminate cured together to form a single, integral structure (2) or such laminates adhesively bonded to a honeycomb (12).

14 Claims, 4 Drawing Sheets

U.S. PATENT DOCUMENTS

| | | | |
|---|---|---|---|
| 4,097,385 | 6/1978 | von Bonin | 428/35 |
| 4,104,073 | 8/1978 | Koide et al. | 106/15 |
| 4,104,426 | 8/1978 | Gonzalez et al. | 428/36 |
| 4,121,790 | 10/1978 | Graham | 244/118 |
| 4,124,732 | 11/1978 | Leger | 428/77 |
| 4,151,800 | 5/1979 | Dotts et al. | 102/105 |
| 4,156,752 | 5/1979 | Riccitiello et al. | 428/220 |
| 4,189,619 | 2/1980 | Pedlow | 174/48 |
| 4,212,925 | 7/1980 | Kratel et al. | 428/447 |
| 4,221,835 | 9/1980 | Severus-Laubenfeld | 428/215 |
| 4,235,836 | 11/1980 | Wassell et al. | 264/333 |
| 4,250,220 | 2/1981 | Schlatter et al. | 28/212 |
| 4,255,483 | 3/1981 | Byrd et al. | 428/245 |
| 4,273,821 | 6/1981 | Pedlow | 428/215 |
| 4,285,842 | 8/1981 | Herr | 252/607 |
| 4,299,872 | 11/1981 | Miguel et al. | 428/117 |
| 4,467,011 | 8/1984 | Brooks et al. | 428/473.5 |
| 4,495,764 | 1/1985 | Gnagy | 60/255 |
| 4,567,076 | 1/1986 | Therrien | 428/246 |
| 4,579,782 | 4/1986 | Kumar et al. | 428/473.5 |

| PANEL NO. | CORE | FACE SHEET / MATRIX | PANEL ASSEMBLY |
|---|---|---|---|
| 1 | HRH-10 | EPOXY | GRAPHITE (CELION)<br>CERAMIC (NEXTEL)<br>CORE<br>CERAMIC (NEXTEL)<br>GRAPHITE (CELION)<br>ALUMINUM COATED FIBER-<br>GLASS HOT SIDE |
| 2 | HRP | EPOXY | |
| 3 | HRH-10 | THERMOPLASTIC | |
| 4 | HRP | THERMOPLASTIC | |
| 5 | HRP | POLYIMIDE (PMR-15) | |
| 6 | HRH-10 | EPOXY | CELION<br>NEXTEL<br>CORE<br>CELION<br>NEXTEL<br>ALUMINUM COATED FIBER-<br>GLASS HOT SIDE |
| 7 | HRP | EPOXY | |
| 8 | HRH-10 | THERMOPLASTIC | |
| 9 | HRP | THERMOPLASTIC | |
| 10 | HRH-10 | EPOXY | CELION<br>KEVLAR<br>CORE<br>NEXTEL<br>NEXTEL<br>ALUMINUM COATED FIBER-<br>GLASS HOT SIDE |
| 11 | HRP | EPOXY | |
| 12 | HRH-10 | THERMOPLASTIC | |
| 13 | HRP | THERMOPLASTIC | |
| 14 | HRP | POLYIMIDE (PMR-15) | |
| 15 | HRH-10 | EPOXY | NEXTEL<br>NEXTEL<br>CORE<br>NEXTEL<br>NEXTEL<br>ALUMINUM COATED FIBER-<br>GLASS HOT SIDE |
| 16 | HRP | EPOXY | |
| 17 | HRP | THERMOPLASTIC | |
| 18 | HRP | POLYIMIDE (PMR-15) | |
| 19 | HRH-10 | EPOXY | CELION<br>CELION<br>CORE<br>NEXTEL<br>NEXTEL<br>NEXTEL<br>NEXTELL  HOT SIDE |
| 20 | HRP | POLYIMIDE (PMR-15) | |
| 21 | HRH-10 | POLYIMIDE (F174) | |
| 22 | HRH-10 | EPOXY | CELION<br>KEVLAR<br>CORE<br>CELION<br>NEXTEL<br>ALUMINUM COATED FIBER-<br>GLASS HOT SIDE |
| 23 | HRH-10 | EPOXY | CELION<br>KEVLAR<br>CORE<br>CELION<br>CELION<br>HOT SIDE |
| 24 | HRH-10 | EPOXY | CELION<br>KEVLAR<br>CORE<br>CELION<br>CELION<br>NEXTEL<br>ALUMINUM COATED FIBER-<br>GLASS HOT SIDE |
| 25 | HRH-10 | THERMOPLASTIC | |

Fig 4

| SPECIMEN TYPE | TEST LOAD (lbs) | FAILURE TIME (MINUTES) |
|---|---|---|
| B | 50 | 10.0 * |
| B | 25 | 1.2 |
| B | 25 | 15.0 * |
|  |  |  |
| C | 50 | 0.9 |
| C | 25 | 1.1 |
| C | 25 | 1.5 |

* TEST TERMINATED BEFORE FAILURE

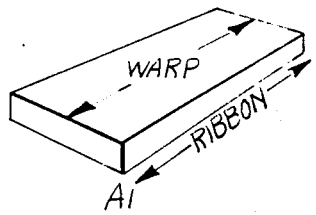
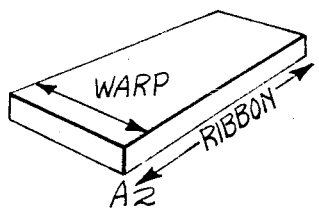
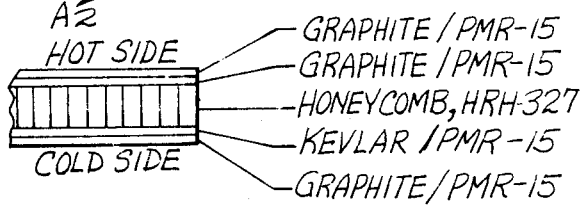
PANEL A1 & A2
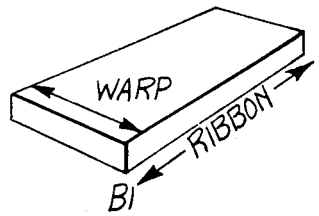
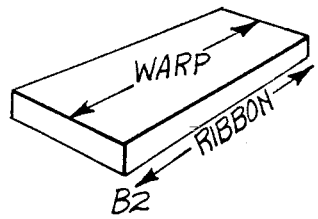
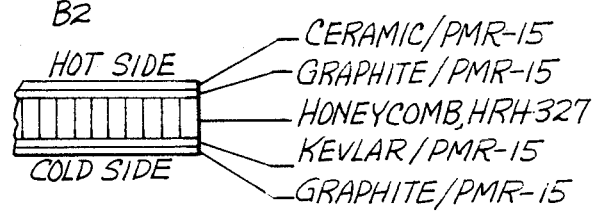
PANEL B1 & B2
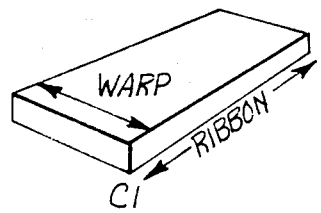
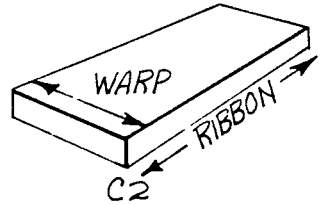
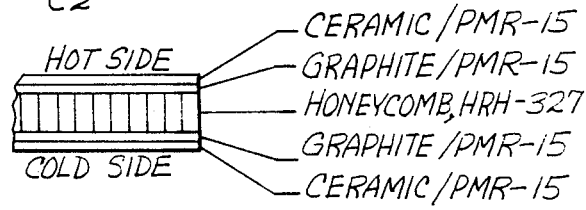
PANEL C1 & C2
Fig. 6

COMPOSITE MATERIAL STRUCTURE WITH INTEGRAL FIRE PROTECTION

DESCRIPTION

1. Technical Field

This invention relates to composite material structures and, more particularly, to such a structure that is load-bearing and that retains its structural strength and resists flame penetration for defined minimum time periods when exposed to intense heat and flame.

2. Background Art

It is well-known that certain areas in an aircraft contain both a potential source of ignition and potential leakage of flammable liquid and/or vapor. In some of these areas, it is not possible to separate the potential ignition sources and any such leakage. Areas in commercial aircraft in which this separation cannot be accomplished are defined as fire zones and are required by the Federal Aeronautics Administration (FAA) to be separated from the rest of the aircraft by "fireproof" firewalls. Under FAA regulations, "fireproof" means able to withstand exposure to heat and flame at least as well as steel, or able to withstand exposure to a 2,000 degree F. flame for fifteen minutes without flame penetration. Designated fire zones include the regions in which each engine, auxiliary power unit, fuel-burning heater, and other combustion equipment intended for operation in flight are located. For example, the combustion, turbine, and tailpipe sections of turbine engines must be isolated from the rest of the aircraft.

In order to meet the FAA requirements, composite structures in engine nacelle and auxiliary power unit high temperature environments must be provided with flame and thermal protection. Known methods for providing such protection involve the use of nonstructural devices to shield the composite material structure. The methods presently in use include the application of a spray-on coating to the surface to be protected and the provision of insulation in the form of a blanket in front of the surface to be protected. These methods have serious drawbacks since they tend to add to the cost of the aircraft, they add to the weight of the aircraft, and they are relatively difficult and expensive to maintain. Spray-on coatings are subject to cracking and peeling and therefore must be repaired or replaced fairly frequently. In addition, spray-on coatings are relatively difficult and time-consuming to inspect, further adding to the maintenance costs. Blanket insulation systems add extra weight to the aircraft, consume valuable space in the aircraft, and are fairly costly to produce. In addition, in known blankets insulation systems the blanket is generally adhesively bonded to the structure being protected. The adhesive bond is subject to peeling problems which add to the cost of maintenance and detract from the reliability of the protection provided.

The patent literature contains a very large number of approaches to providing fire protection. The following U.S. patents each disclose structures made from metal or mostly from metal that are used in the construction of aircraft-type engines or as firewalls in the immediate vicinity of such engines: U.S. Pat. Nos. 2,405,785, granted Aug. 13, 1946 to R. H. Goddard; 2,532,709, granted Dec. 5, 1950, to R. H. Goddard; 2,551,112, granted May 1, 1951, to R. H. Goddard; 2,551,115, granted May 1, 1951, to R. H. Goddard; 2,795,109, granted June 11, 1957, to W. Hryniszak; 2,986,878, granted June 6, 1961, to S. J. Townsend; 3,352,105, granted Nov. 14, 1967, to N. P. Cox et al; and 3,779,006, granted Dec. 18, 1973, to B. Lewis et al.

U.S. Pat. Nos. 2,632,743, granted Mar. 24, 1953, to L. W. Eckert, and 4,095,985, granted June 20, 1978, to W. F. Brown disclose five retardant coatings for application to surfaces requiring fire protection. U.S. Pat. Nos. 2,743,188, granted Apr. 24, 1956, to S. N. Hunter, 4,097,385, granted June 27, 1978, to W. von Bonin, and 4,104,073, granted Aug. 1, 1978, to Y. Koide et al each disclose a fire resistant putty or sealer. U.S. Pat. Nos. 3,849,178, granted Nov. 19, 1974, to R. Feldman, 3,916,057, granted Oct. 28, 1975, to R. A. Hatch et al, and 4,156,752, granted May 29, 1979, to S. R. Riccitiello et al disclose intumescent materials. U.S. Pat. No. 3,875,106, granted Apr. 1, 1975, to V. C. Lazzaro discloses an ablative coating.

Various ways of providing thermal insulation are disclosed in U.S. Pat. Nos. 3,296,060, granted Jan. 3, 1967, to V. F. Seitzinger, 3,567,162, granted Mar. 2, 1971, to J. M. Lea, 3,799,056, granted Mar. 26, 1974, to P. Colignon, and 4,151,800, granted May 1, 1979, to R. L. Dotts et al. Seitzinger discloses a ceramic flame resistant insulating agent that is applied to a base structure in relatively thick layers. Colignon discloses insulation for use between a heat shield and the body of a space vehicle. This insulation has an outer thin metal sheet, filling and refractory screens in the middle, and an inner layer of foamed polyimide.

U.S. Pat. Nos. 3,630,988, granted Dec. 28, 1971, to E. J. Deyrup, 3,703,385, granted Nov. 21, 1972, to C. E. Zwickert, 4,189,619, granted Feb. 19, 1980, to J. W. Pedlow, 4,235,836, granted Nov. 25, 1980, to L. L. Wassell et al, and 4,285,842, granted Aug. 25, 1981, to A. K. Herr each disclose a fire resistant or fire retardant material. U.S. Pat. No. 4,273,821, granted June 16, 1981, to J. W. Pedlow discloses a fire resistant tape for wrapping around devices such as electric power and control cables.

U.S. Pat. No. 4,121,790, granted Oct. 24, 1978, to E. F. Graham discloses a temporary fire barrier in the form of an inflatable curtain for use in aircraft cabin areas. U.S. Pat. No. 4,124,732, granted Nov. 7, 1978, to L. J. Leger discloses a felt insulation pad for use between ceramic heat insulation tiles and the body of a space vehicle to protect the tiles from thermal and mechanical stresses.

U.S. Pat. Nos. 3,092,530, granted June 4, 1963, to W. A. Plummer, 3,930,916, granted Jan. 6, 1976, to S. J. Shelley, and 4,104,426, granted Aug. 1, 1978, to R. Gonzalez et al each disclose a fire resistant panel or sheath that is entirely or mostly non-metallic and apparently nonstructural. Shelley discloses a lining for furnaces or ovens that includes an outer layer of a ceramic fiber blanket material. The fiber in this layer are oriented at 90° to the support to which the lining is attached. Gonzalez et al disclose a heat resistant acoustical insulation for use with mufflers and the like. The insulation includes an alumina-silica ceramic fiber mat that is impregnated and coated with a colloidal silica.

The following U.S. patents each disclose a structural member that is described as being fire resistant: U.S. Pat. Nos. 3,106,503, granted Oct. 8, 1963, to B. M. Randall et al; 3,122,883, granted Mar. 3, 1964, to E. Terner; 3,137,602, granted June 16, 1964, to J. D. Lincoln; 3,967,033, granted June 29, 1976, to R. E. Carpenter; 4,212,925, granted July 15, 1980, to G. Kratel et al; and 4,221,835, granted Sept. 9, 1980, to H. Severus-Laubenfeld.

Randall et al disclose a honeycomb structure made from paper and/or asbestos with a cemetitious coating of, for example, Portland Cement or water and gypsum plaster. Terner discloses a heat resistant wall structure for rocket motor nozzles and the like. The wall has an outer steel portion, intermediate laminations of a refractory material such as graphite, insulating layers of material such as silica or quartz between these laminations, and an inner vented layer of a ceramic or metalloceramic material. Lincoln discloses a ceramic honeycomb structure for use in flight vehicle environments such as a missile nose cone. Carpenter discloses a fire retardant panel for use in the construction of buildings. Kratel et al disclose a process for making silicon dioxide containing heat insulating articles hydrophobic without affecting their mechanical strength by treating their surfaces with an organo-silicon compound. Severus-Laubenfeld discloses a lightweight flame resistant panel having a metallic skin on either side and a thermoplastic core including a rigid polyvinylchloride.

U.S. Pat. Nos. 2,835,107, granted May 20, 1958, to J. M. Ward, 3,666,617, granted May 30, 1972, to H. W. Marcbriak, 3,930,085, granted Dec. 30, 1975, to W. T. Pasiuk, and 4,299,872, grated Nov. 10, 1981, to A. S. Miguel at al each disclose a fire retardant thermal barrier that is made from a fiber reinforced composite material and that is apparently nonstructural. Pasiuk discloses a method of providing a thermal barrier for polyimide substrates. The method provides a barrier that will withstand 3,000° F. for ninety seconds without permitting the rear surface of the barrier to reach a temperature of above 700° F. The barrier provided includes a quartz face sheet impregnated with zircon-silica, a ceramic foam core or honeycomb core filled or coated with zircon-silica, and an inner layer comprising a glass-polyimide laminate. The use of polyimide or ceramic adhesives for securing the inner laminate is described. Miguel et al discloses a thermal barrier to be adhesively bonded to the interior of an aircraft skin. The barrier includes an intumescent material in a honeycomb structure made from a material such as glass-phenolic. The intumescent material may be provided with a filler, and a ceramic is described as being one material suitable for use as a filler.

The patent literature relating to fire and thermal protection also includes a number of approaches to providing a structure made from a fiber reinforced composite material that is both load-bearing and fire resistant. U.S. Pat. No. 2,992,960, granted July 18, 1961, to K. J. Leeg et al describes a temperature resistant composite material in which the resin has elemental boron incorporated in it. U.S. Pat. No. 3,210,233, granted Oct. 5, 1965, to D. L. Kummer et al discloses a reinforced composite material honeycomb structure for use as a reentry heat shield and the like. The honeycomb structure has a heat insulating and ablative filler of a material such as dry phenolic powder or a fused silica composite.

U.S. Pat. No. 3,573,123, granted Mar. 30, 1971, to R. A. Siegel et al discloses a high temperature resistant composite material for use in combustion chambers, nozzles, heat shields, and the like. The material has an inner portion that includes carbon fibers for strength and an outer portion having a phenolic or epoxy resin with silica for insulation. The interface between the inner and outer portions is interlocked to resist delamination.

U.S. Pat. No. 3,600,249, granted Aug. 17, 1971, to W. T. Jackson et al discloses a method for manufacturing a reinforced honeycomb structure having a high temperature resistance for use in spacecraft and the like. The honeycomb structure may be made from a glass fiber mat impregnated with a polyimide resin.

V. Abolins, U.S. Pat. No. 3,671,487, granted June 20, 1972, discloses a fire retardant material made from polyesters reinforced with glass. Rottmayer et al, U.S. Pat. No. 3,713,959, granted Jan. 30, 1973, disclose a material having graphite yarn in an epoxy matrix. The material has a very low coefficient of thermal expansion for use in applications like space vehicles.

E. L. Yuan, U.S. Pat. No. 3,811,997, granted May 21, 1974, discloses smoke and flame resistant structural articles for use in aircraft. The articles may be of a laminate or a honeycomb construction. The articles are provided with a thin film of polyimide or polyamide to retard combustion of the underlying laminate and reduce smoke effusion from any buring that does occur.

I. K. Park, U.S. Pat. No. 3,914,494, granted Oct. 21, 1975, discloses a material for use, for example, as a facing sheet for a sandwich liner for noise suppression in a jet engine. The lightweight material includes woven carbon fibers in a resin matrix. The resin may be a phenolic or a polyimide.

Ray et al, U.S. Pat. No. 3,933,689, granted Jan. 20, 1976, disclose adding a glass with a low softening point to a reinforced composite material to give the material fire retardant properties. Gilwee, Jr. et al, U.S. Pat. No. 4,061,812, granted Dec. 6, 1977, disclose a honeycomb core laminate structure for use in aircraft. The honeycomb may be made from a polyquinoxaline foam. The structure has a composite outer layer, preferably with a polyimide resin matrix and reinforcing noncombustible fibers, such as glass.

U.S. Pat. No. 4,250,220, granted Feb. 10, 1981, to R. Schlatter et al discloses a composite material panel for use in the construction of buildings. The panel has a cover sheet on each of its two faces and a core between the sheets made from a mixture of granular filler material and a binding agent.

U.S. Pat. No. 4,255,483, granted Mar. 10, 1981, to N. R. Byrd et al discloses an acoustic firewall for use in environments such as an aircraft engine nacelle. The firewall includes a graphite fiber or glass cloth embedded in a silica-containing polyimide resin. The presence of the silica is described as being necessary to provide the polyimide resin and the firewall with the desired stability in the presence of a fire and with low thermal conductivity.

The above patents and the prior art that is discussed and/or cited therein should be studied for the purpose of putting the present invention into proper perspective relative to the prior art.

DISCLOSURE OF THE INVENTION

According to an aspect of the invention, a load-bearing composite material structure with integral thermal and flame protection comprises a plurality of layers of composite material. Each of these layers includes a matrix material that maintains its structural integrity at temperatures of about 1200° F. for at least about five minutes. Each of the layers that are on an outer surface of the structure and that will be directly exposed to a fire in a designated zone includes a reinforcing fibrous flame barrier that is sufficiently flame resistant to prevent penetration of a flame with a temperature of about 2000° F. for at least about fifteen minutes. Each of the rest of the layers includes a reinforcing fibrous material that is sufficiently strong to provide the desired load-bearing characteristics. All of the layers are bonded together to form a single, integral load-bearing and substantially fireproof structure. Preferably, the flame barrier comprises a reinforcing woven fabric that is sufficiently flame resistant and has a sufficiently fine weave to so prevent penetration of a flame.

According to a preferred aspect of the invention, the reinforcing woven fabric is a ceramic fabric. In the preferred embodiments, this ceramic fabric is Nextel XC-568 (a Trademark for a ceramic fabric manufactured by Hexcel Corporation of Dublin, Calif.).

According to another preferred aspect of the invention, the matrix material in each of the layers is a polyimide resin.

According to still another preferred aspect of the invention, the fibrous material comprises graphite fibers.

The structure of the invention may be either of an entirely laminate construction, a honeycomb construction, or a combination of laminate and honeycomb construction. In one preferred embodiment of the invention, one of the layers positioned in an intermediate portion of the structure has a honeycomb configuration. The fibrous material in this honeycomb layer is preferably a glass material. In another preferred embodiment of the invention, each layer has a sheet-like configuration, and all of the layers are cured together to bond them together. Preferably, the fibrous material in these sheet-like layers comprises graphite fibers.

According to a method aspect of the invention, a method of manufacturing a load-bearing composite material structure and of providing such structure with flame and thermal protection comprises forming a plurality of layers of composite material into a desired shape. Each such layer is provided with a matrix material that maintains its structural integrity at temperatures of about 1200° F. for at least about five minutes. Each outer layer that will be directly exposed to a fire in a designated zone is reinforced with a fibrous flame barrier that is sufficiently flame resistant to prevent penetration of a flame with a temperature of about 2000° F. for at least about fifteen minutes. The rest of the layers are reinforced with a fibrous material that is sufficiently strong to provide the desired load-bearing characteristics. All of the layers are bonded together to form a single, integral load-bearing and substantially fireproof structure.

The method and apparatus of the invention solve the problems discussed above in relation to providing composite structures in engine nacelle and auxiliary power unit high temperature environments with FAA required fire and thermal protection. In structures constructed according to the invention, the fire and thermal protection is provided by the load-bearing structure itself, and therefore, there is no need to add nonstructural thermal and fire protection to the structure. This results in considerable weight savings in the aircraft. There is also a considerable savings in space in comparison to conventional blanket insulation methods of providing fire and thermal protection. In situations in which a structure constructed according to the invention may be substituted for a conventional structure and its associated fire and thermal protection means, there may also be a significant savings in the overall cost of the aircraft. When a metallic firewall is replaced by a structure made according to the invention, weight and cost savings may be achieved, and there is the additional benefit of a reduced need to isolate systems behind the structure because of much lower heat fluxes through the composite structure.

Structures constructed according to the invention meet the F.A.A. requirements for maintaining structural integrity and for resisting flame penetration but are not subject to the numerous maintenance problems associated with commonly used methods for providing flame and thermal protection. Structures of the invention are relatively easy to inspect and should not require any more than routine maintenance unless there is actually a fire in the fire zone to which the structure is exposed. The problems of cracking and peeling associated with providing protection in the form of coatings are not experienced by structures of the invention. In addition, the structures are made from a single integral unit. Thus, the problems of peel and delamination experienced with blanket installations are avoided. The result is a great savings in the time and cost required to maintain the structures.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 4 is a table showing the configurations of the test panels in the flame penetration test.

FIG. 6 is a table showing the configurations of the test panels in the load test.

BEST MODES FOR CARRYING OUT THE INVENTION

Figure 1:
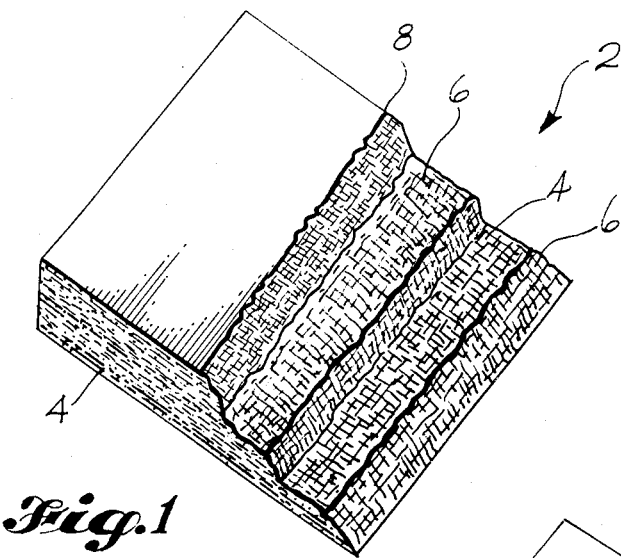
FIG. 1 is a pictorial view of a laminate panel constructed in accordance with a first preferred embodiment of the invention.
Figure 2:
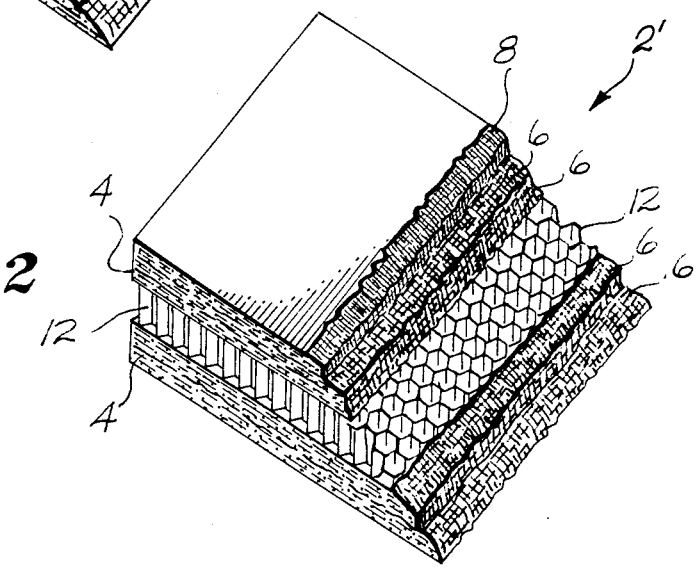
FIG. 2 is a pictorial view of a laminate/honeycomb panel constructed in accordance with a second preferred embodiment of the invention.

The drawings show composite material panels 2, 2' that are constructed according to the invention and that also constitute the best modes of the apparatus of the invention currently known to the applicant. FIG. 1 illustrates a laminate composite material structure 2. FIG. 2 illustrates a honeycomb composite material structure 2' with laminates forming a skin or face sheet on either side of the honeycomb 12. It is anticipated that structures such as those shown in the drawings and other structures constructed in accordance with the invention will primarily be used in aircraft environments in which the structures will be exposed to a fire zone as defined by FAA regulations. However, it is of course to be understood that structures constructed according to the invention may be used to advantage in other environments in which there is a need for a load-bearing structure that will maintain its structural integity when exposed to high temperatures and that will resist the penetration of flame.

A structure constructed in accordance with the invention is designed to be load-bearing and to have integral thermal and flame protection. Each such structure comprises a plurality of layers of composite material. These layers may have an entirely laminate construction (sheet-like layers), a honeycomb construction, or a construction that is a combination of laminate and honeycomb. The laminate and/or honeycomb structure in each case may be flat or shaped or contoured to meet the requirements of a particular installation. Each of the layers include a matrix material 4 that is sufficiently temperature resistant to meet FAA requirements for component structural integrity. The matrix material must maintain its structural integrity at a temperature of 1200° F. for at least five minutes. The FAA requirements also provide that the structure must resist the penetration of a flame with a temperature of 2000° F. for at least fifteen minutes. In order to comply with this requirement, a structure constructed in accordance with the invention has each of its layers that is on an outer surface of the structure and that will be directly exposed to a fire in a designated fire zone reinforced by a fibrous flame barrier that has the required resistance to flame penetration. Preferably, the flame barrier includes a woven fabric that is sufficiently flame resistant and has a sufficiently fine weave to prevent penetration of such a flame for at least fifteen minutes. The outer surface of the structure may of course be provided with various coatings for various purposes. Such coatings are generally quickly consumed by a fire and, thus, do not provide any protection for the outer layer of composite material against direct exposure to a fire.

The remainder of the layers that will not be directly exposed to a fire in the fire zone are reinforced with a fibrous material that is sufficiently strong to provide the desired load-bearing characteristics. The specific type of fibrous material and its orientation and/or weave will of course be chosen to meet the load requirements of a particular situation. In general, graphite fibers (such as the graphite fiber sold by Celanese Corporation under the trademark Celion) or aramid fibers (such as the aramid fiber sold by DuPont under the trademark Kevlar) in either a parallel or a woven arrangement would be suitable. Graphite fibers have the advantage that their coefficent of thermal expansion along their length is close to zero. In the case of a honeycomb or partially honeycomb construction, the reinforcing fibers in the honeycomb portion of the structure may be glass fibers. (Examples of suitable honeycomb materials include the materials sold by the Hexcel Corporation under the HRP glass reinforced phenolic honeycomb and HRH-b 327 glass reinforced polyimide honeycomb). The reinforcing woven fabric in the outer layers that are directly exposed to the fire prevent penetration of the fire into the lower layers and therefore prevent exposure of the graphite, aramid, and glass fibers to the flame of the fire.

In the preferred embodiments of the invention, the reinforcing woven fabric 8 that resists penetration of flame is a very finely woven ceramic fabric, such as the fabric sold by Hexcel Corporation of Dublin, Calif. under the Trademark Nextel XC-568. This and similar fabrics, being made of a ceramic material, have a low coefficient of thermal expansion, are not consumed by fire, provide good compression strength, and compared to graphite fibers heat up very slowly. All of these are important advantages in an environment in which the fabric must provide flame and thermal protection.

The matrix material for each of the layers, whether a laminate or a honeycomb layer, must of course meet the above stated requirement for structural integrity. Resins that are suitable for the matrix material include various polyimides for laminate layers and various phenolics and polyimides for honeycomb layers. The preferred resins for use in all of the laminate layers are the polyimide resin designated by the National Aeronautics and Space Administration as PRM-15 and the polyimide resin sold by Hexcel Corporation under the Trademark F174.

The laminate structure shown in FIG. 1 has an outer layer of polyimide resin 4 reinforced with a woven ceramic fabric 8. The remainder of the layers have a matrix 8 of the same polyimide resin and are reinforced by a woven graphite fabric 6. A panel such as that shown in FIG. 1 may be manufactured in a variety of known ways. The various layers of the composite material are preferably laid on a mandrel having the shape of the finished panel. (The panel shown in FIG. 1 is essentially flat, but of course its shape could be varied considerably to meet the needs of a particular situation without departing from the spirit and scope of the invention.) As each layer is laid, it is formed and compacted to the shape of the mandrel in a known fashion. When all of the sheet-like layers have been laid and formed into the desired shape, the layers are cured together to form a single, integral load-bearing and substantially fireproof structure 2. In this description, the term "fireproof" is intended to be understood as meaning able to meet the FAA requirements for thermal and flame resistance.

The honeycomb/laminate structure shown in FIG. 2 has two laminate portions of essentially the same construction as the construction of the panel shown in FIG. 1. Each of the two laminate portions is preferably manufactured by a process such as that described above in connection with the panel shown in FIG. 1. The honeycomb portion 12 of the structure is formed from the same or a similar polyimide resin as that used in the laminate portions. In the structure shown in FIG. 2, the polyimide in the honeycomb 12 is reinforced by glass fibers. The honeycomb 12 is formed and cured separately from the two laminate portions and then is adhesively bonded to the laminates to form the structure shown in the drawings. Preferably, a polyimide adhesive is used to bond the honeycomb 12 to the laminates. When all of the layers are bonded together, they form a single, integral load-bearing and substantially fireproof structure 2'.

The following is a summary of the results of testing of a number of composite material panels, including some panels constructed according to the invention.

Figure 3:
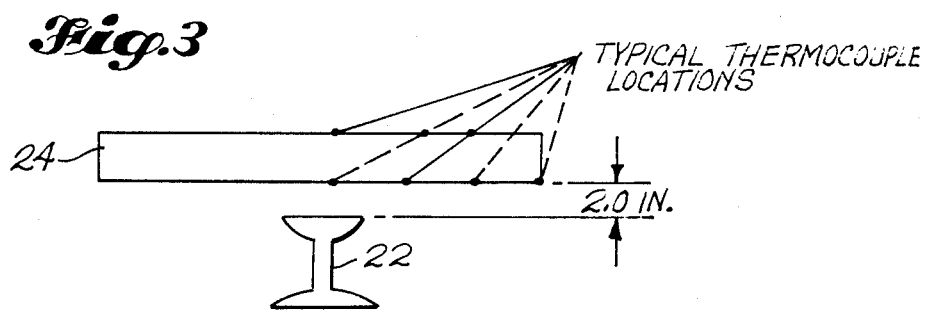
FIG. 3 is a schematic view of the flame penetration test arrangement.

In a first set of tests, twenty-five honeycomb sandwich panels were tested for resistance to flame penetration. Each panel 24 was clamped in a fixture and thermocouples were attached between the layers of the panel 24. A six-inch diameter burner 22 was positioned to operate two inches below the panel lower surface. FIG. 3 illustrates the test arrangement. FIG. 4 is a table showing the composition of the layers of each of the test panels. Each panel had an epoxy matrix, a polyimide matrix or a solvent resistant polysulphone and polyether sulphone thermoplastic matrix.

Following approximately four minutes of exposure to a 2,000 degree F. flame, it was observed that the flame did not completely penetrate through any of the panel face sheets. The epoxy panels exhibited heavy smoke for about three minutes into the test. The epoxy matrix was totally consumed on the hot side in about four minutes, and cold side damage was extensive. The total matrix loss on the cold side covered a circular area of about an eight inch diameter. The polyimide panels showed about an eight inch hot side delamination and no cold side damage. The polyimide matrix systems did not smoke during testing and degraded or ablated at a much slower rate than the epoxy matrix systems. The thermoplastic panels showed no perceptible cold side damage but did exhibit softening on the cold side which indicated a loss of structural properties. Hot side damage in the thermoplastic panels was less severe than in the epoxy panels and more severe than in the polyimide panels.

Three types of honeycomb cores were used in the test panels. These were the aramid fiber reinforced phenolic designated HRH-10 by Hexcel Corporation, the glass fiber reinforced phenolic designated HRP by Hexcel Corporation, and the glass fiber reinforced polyimide designated HRH-327 by Hexcel Corporation. The cores showed increasing resistance to core damage in the stated order.

The use of ceramic fabric as a hot-side flame stopper was shown to be highly effective. Damage to graphite fibers behind the ceramic fiber was minimal compared to damage to graphite fibers exposed directly to the flame. The ceramic fabric stopped the flame and provided maximum protection when placed in the ply of material closest to the flame.

Figures 5, 7:
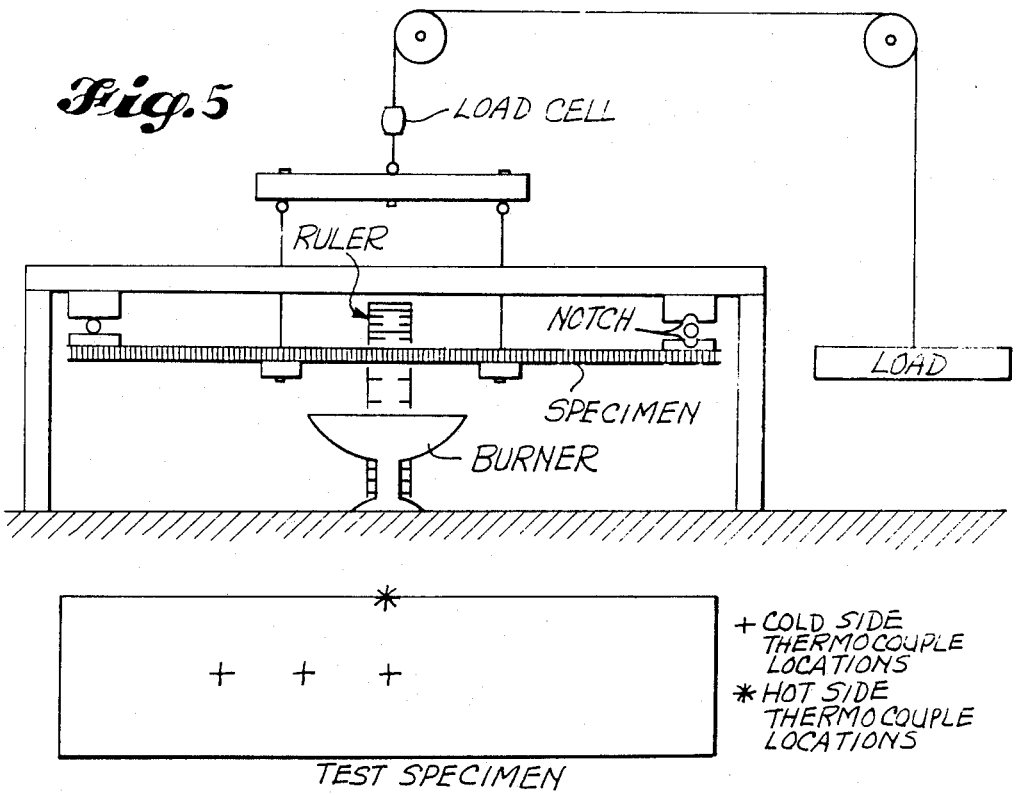
FIG. 5 is a schematic view of the load test arrangement.
FIG. 7 is a table summarizing the results of the load test.

In a second set of tests, three types of honeycomb sandwich panels were tested for the maintenance of structural integrity when exposed to very high temperatures. FIG. 6 illustrates the composition of each of the three types of panels. The panels tested had three types of face sheet materials, a graphite fabric, the ceramic fabric sold under the trademark Nextel, and the Aramid fabric sold by the Dupont company under the name Kevlar. Each panel was tested at room temperature as fabricated and then tested with a static load during a 1200 degree F. flame exposure. FIG. 5 illustrates the test arrangement.

The results of the tests showed that a hybrid face sheet including both ceramic and graphite fibers is more effective in supporting loads during a fire than a face sheet made up of graphite alone. Such hybrid face sheets have an outer ply of ceramic reinforced polyimide resin and an inner ply of graphite reinforced polyimide resin. The test results on this type of panel, designated type B in FIG. 6 were not entirely consistent. Two of three specimens carried 60% of the average room temperature failure load for an entire 15 minutes with a 1200 degree F. flame exposure. However, one identical specimen failed within one minute of exposure at the same load level under a fire condition. FIG. 7 summarizes the results of the load tests. The test panels of type A are omitted from the table in FIG. 7 because they did not meet even minimal fireproof criteria. As can be seen in FIG. 6, panels of type A had an entirely graphite face sheet on a honeycomb structure. The table in FIG. 7 shows that the panels of type C, which had a ceramic ply on both the hot side and the cold side, exhibited some structural stability but failed to meet the 5 minute requirement.

A close inspection of the failed type B specimen revealed that the failure mode occurred in the area where the face sheets were adhesively bonded to the honeycomb structure. In comparison, type A specimens experienced failures within the graphite reinforced polyimide face sheets.

The test results clearly show that the provision of a ceramic fabric is very effective for providing the necessary flame penetration protection. The prevention of penetration by a flame acts to slow the deterioration of the rest of the structure so that the structure can meet and in many cases exceed the FAA requirements for resisting structural deterioration due to exposure to high temperatures. Under normal conditions, the ceramic fabric has enough strength to carry part of the structural load. Under fire conditions, the ceramic fiber provides the described flame protection and the high temperature matrix material deteriorates or ablates at an extremely slow rate compared to more conventional matrix materials such as epoxy resins. The overall result is a structure that meets or exceeds the FAA requirements.

It is of course to be understood that structures constructed according to the invention may take a variety of forms and have a variety of shapes. Structures that may advantageously be constructed according to the invention include engine nacelles, walls that border on a fire zone, and beams that face a fire zone.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. A load-bearing composite material structure with integral thermal and flame protection, said structure comprising a plurality of layers of composite material; said layers including a plurality of inner layers, and an outer layer on an outer surface of said structure; said outer layer and each of said inner layers including a matrix material that maintains its structural integrity at temperatures of about 1200° F. for at least about 5 minutes; said outer layer including a reinforcing fibrous flame barrier that is embedded in said matrix material and that is sufficiently flame resistant to prevent penetration of a flame with a temperature of about 2000° F. for at least about 15 minutes when said outer surface is directly exposed to a fire; and each of said inner layers including a reinforcing fibrous material that is embedded in said matrix material and that is sufficiently strong to provide predetermined load-bearing characteristics;
   wherein all of the layers are bonded together to form a single, integral load-bearing and substantially fireproof structure.

2. A structure as described in claim 1, in which the flame barrier comprises a reinforcing woven fabric; said fabric having a sufficiently fine weave, and being made from a material that is sufficiently flame resistant, to prevent penetration of a flame with a temperature of about 2000° F. for at least about 15 minutes.

3. A structure as described in claim 2, in which said reinforcing woven fabric is a ceramic fabric.

4. A structure as described in claim 2, in which said matrix material in said outer layer and in each of said inner layers is a polyimide resin.

5. A structure as described in claim 3, in which said matrix material in said outer layer and in each of said inner layers is a polyimide resin.

6. A structure as described in claim 1, in which said fibrous material in said inner layers comprises graphite fibers.

7. A structure as described in claim 1, in which one of said inner layers positioned in an intermediate portion of said structure has a honeycomb configuration.

8. A structure as described in claim 7, in which said fibrous material in said inner layer with a honeycomb configuration is a glass material.

9. A structure as described in claim 1, in which each of said outer layer and said inner layers has a sheet-like configuration, and said outer layer and said inner layers are cured together to bond them together.

10. A structure as described in claim 9, in which said fibrous material in said inner layers comprises graphite fibers.

11. In a flight vehicle, a load-bearing composite material structure with integral thermal and flame protection, said structure being positioned to separate a designated fire zone from other portions of the vehicle, and said structure comprising a plurality of layers of composite material; said layers including a plurality of inner layers, and an outer layer on an outer surface of said structure that faces and is exposed to said designated zone; said outer layer and each of said inner layers including a matrix material that maintains its structural integrity at temperatures of about 1200° F. for at least about 5 minutes; said outer layer including a reinforcing fibrous flame barrier that is embedded in said matrix material and that is sufficiently flame resistant to prevent penetration of a flame with a temperature of about 2000° F. for at least about 15 minutes; and each of said inner layers including a reinforcing fibrous material that is embedded in said matrix material and that is sufficiently strong to provide predetermined load-bearing characteristics;
wherein all of the layers are bonded together to form a single, integral load-bearing and substantially fireproof structure.

12. A structure as described in claim 11 in which the flame barrier comprises a reinforcing woven fabric; said fabric having a sufficiently fine weave, and being made from a material that is sufficiently flame resistant, to prevent penetration of a flame with a temperature of about 2000° F. for at least about 15 minutes.

13. A structure as described in claim 11 in which the flame barrier comprises a reinforcing woven ceramic fabric, said fabric having a sufficiently fine weave, and being made from a material that is sufficiently flame resistant, to prevent penetration of a flame with a temperature of about 2000° F. for at least about 15 minutes; in which said matrix material in said outer layer is a polyimide resin; and in which, in at least some of said inner layers, said matrix material is a polyimide resin and said fibrous material comprises graphite fibers.

14. A method of providing a fire zone in a flight vehicle with a load-bearing composite material structure and of protecting said structure from high temperatures and fire in said zone, said method comprising:
forming a plurality of layers of composite material into a desired shape;
providing each such layer with a matrix material that maintains its structural integrity at temperatures of about 1200° F. for at least about 5 minutes;
reinforcing one of said layers with a fibrous flame barrier that is sufficiently flame resistant to prevent penetration of a flame with a temperature of about 2000° F. for at least about 15 minutes;
reinforcing the rest of the layers with a fibrous material that is sufficiently strong to provide predetermined load-bearing characteristics;
bonding all of the layers together to form a single, integral load-bearing and substantially fireproof structure; and positioning said one of said layers on an outer surface of said structure; and
positioning said integral fireproof structure to bear loads, with said outer surface facing and exposed to said fire zone.

* * * * *

UNITED STATES PATENT AND TRADEMARK OFFICE
CERTIFICATE OF CORRECTION

PATENT NO. : 4,767,656
DATED : August 30, 1988
INVENTOR(S) : Wan T. Chee, Douglas McLaren & Keith E. Therrien It is certified that error appears in the above-identified patent and that said Letters Patent are hereby corrected as shown below:

Column 1, line 52, "blankets" should be -- blanket --.

Column 2, line 5, "five" should be -- fire --.

Column 6, lines 66 and 67, "integity" should be -- integrity --.

Column 7, lines 52 and 53, "HRH-b 327" should be -- HRH-327 --.

Column 8, line 9, "PRM-15" should be -- PMR-15 --.

Column 9, line 26, "fiber" should be -- fabric --.

Signed and Sealed this

Eleventh Day of April, 1989

Attest:

DONALD J. QUIGG

Attesting Officer

Commissioner of Patents and Trademarks